US009923639B2

(12) United States Patent
Schemmann et al.

(10) Patent No.: US 9,923,639 B2
(45) Date of Patent: *Mar. 20, 2018

(54) OPTICAL COMBINER ENERGY HARVESTING

(71) Applicant: ARRIS Enterprises LLC, Suwanee, GA (US)

(72) Inventors: Marcel F. Schemmann, Maria Hoop (NL); Venkatesh G. Mutalik, Middletown, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,933

(22) Filed: Jun. 28, 2016

(65) Prior Publication Data
US 2016/0308621 A1 Oct. 20, 2016

Related U.S. Application Data

(63) Continuation of application No. 14/676,887, filed on Apr. 2, 2015, now Pat. No. 9,413,468.
(Continued)

(51) Int. Cl.
*H04B 10/27* (2013.01)
*H04B 10/572* (2013.01)
(Continued)

(52) U.S. Cl.
CPC ........... *H04B 10/572* (2013.01); *H04B 10/27* (2013.01); *H04B 10/80* (2013.01); *H04B 10/807* (2013.01);
(Continued)

(58) Field of Classification Search
CPC ...... H04B 10/572; H04B 10/27; H04B 10/80; H04B 10/807; H04J 14/0238;
(Continued)

(56) References Cited

U.S. PATENT DOCUMENTS 5,262,883 A 11/1993 Pidgeon et al.
5,331,449 A 7/1994 Huber et al.
(Continued)

FOREIGN PATENT DOCUMENTS

EP 1235434 A2 10/2005
EP 2538861 A2 1/2013
(Continued)

OTHER PUBLICATIONS

"OBI free", retrieved from the Internet at <http://www.emc-web.com/J_emc/index.php?option=com_content&view=article&id=165:obi-free&catid=47:paper&Itemid=182\> on Mar. 24, 2015.
(Continued)

*Primary Examiner* — Dalzid Singh
(74) *Attorney, Agent, or Firm* — Lori Anne D. Swanson

(57) ABSTRACT

Powering an active/splitter and providing information to ONUs to cause adjustments to ONU operating wavelengths. An ONU may identify the port of a splitter to which the ONU is connected in order to make wavelength adjustments. Various techniques enable the ONU to identify from which port the ONU is receiving signals, such as a splitter that splits signals to ONUs in a cable network and signals to one or more ONUs the port to which it is connected. The splitter may lack electrical power and may perform the signal function by harvesting optical power from optical power provided to the splitter. In this manner, an active splitter may behave passively with respect to powering components in the absence of electrical power.

14 Claims, 8 Drawing Sheets

Related U.S. Application Data

(60) Provisional application No. 61/982,089, filed on Apr. 21, 2014, provisional application No. 62/043,787, filed on Aug. 29, 2014, provisional application No. 62/043,793, filed on Aug. 29, 2014.

(51) Int. Cl.
  *H04B 10/80* (2013.01)
  *H04J 14/02* (2006.01)
  *H04Q 11/00* (2006.01)

(52) U.S. Cl.
  CPC ...... *H04J 14/0238* (2013.01); *H04J 14/0242* (2013.01); *H04J 14/0267* (2013.01); *H04Q 11/0005* (2013.01); *H04Q 2011/0015* (2013.01)

(58) Field of Classification Search
  CPC .............. H04J 14/0242; H04J 14/0267; H04Q 11/0005; H04Q 2011/0015
  USPC .......................................................... 398/48
  See application file for complete search history.

(56) References Cited

U.S. PATENT DOCUMENTS

| | | | |
|---|---|---|---|
| 5,559,624 | A | 9/1996 | Darcie et al. |
| 5,914,799 | A | 6/1999 | Tan |
| 6,041,056 | A | 3/2000 | Bigham et al. |
| 7,941,022 | B1 | 5/2011 | Schaffner et al. |
| 8,837,953 | B2 | 9/2014 | Mutalik et al. |
| 9,413,468 | B2* | 8/2016 | Schemmann ........ H04B 10/572 |
| 2009/0238559 | A1* | 9/2009 | Pfeiffer .................. H04B 10/27 398/17 |
| 2009/0279896 | A1 | 11/2009 | Hufstedler et al. |
| 2012/0148241 | A1* | 6/2012 | Piehler ............... H04Q 11/0067 398/49 |
| 2012/0288273 | A1 | 11/2012 | Pöhlmann et al. |
| 2012/0308237 | A1 | 12/2012 | Mutalik et al. |
| 2013/0071123 | A1* | 3/2013 | Lee ....................... H04B 10/572 398/82 |
| 2014/0233955 | A1 | 8/2014 | Gadkari et al. |
| 2014/0270772 | A1 | 9/2014 | Lutgen et al. |

FOREIGN PATENT DOCUMENTS

| | | |
|---|---|---|
| EP | 2675089 A1 | 12/2013 |
| EP | 2863564 A1 | 4/2015 |
| WO | 2011161637 A2 | 12/2011 |
| WO | 2013185306 A1 | 12/2013 |

OTHER PUBLICATIONS

A. Tan, "Super Pon—A Fiber to the Home Cable Network for CATV and POTS/ISDN/VOD as Economical as a coaxial Cable Network", Journal of Lightwave Technology, vol. 15, No. 2, Feb. 1997, pp. 213-218.

"HRL Laboratories, LLC: About Us", retrieved from the Internet at <http://www.hrl.com/aboutUs/abt_main.html> on Mar. 24, 2015.

A. Al-Banna, et al., "Beat it! Handling Optical Beat Interference in RFOG Systems", ARRIS White Paper, ARRIS Enterprises, Inc., 2014, 31 pgs.

V. Mutalik, et al., "Partnership for Extended Capacity: DOCSIS 3.1 with RFoG", ARRISS White Paper, 2013, 18 pgs.

V. Mutalik, et al., "Partnership for Extended Capacity: DOCSIS 3.1 with RFoG", ARRIS PowerPoint Presentation, 2014 Spring Technical Forum, Apr. 30, 2014.

PCT Search Report & Written Opinion, Re: Application No. PCT/US2015/024101, dated Jul. 7, 2015.

\* cited by examiner

OPTICAL COMBINER ENERGY HARVESTING

CROSS-REFERENCE TO RELATED APPLICATIONS

This application is a continuation of U.S. application Ser. No. 14/676,887, filed on Apr. 2, 2015, which claims the benefit of priority under 35 U.S.C. § 119(e) to U.S. Provisional Application No. 61/982,089, filed on Apr. 21, 2014, U.S. Provisional Application No. 62/043,787 filed on Aug. 29, 2015, and U.S. Provisional Application No. 62/043,793 filed on Aug. 29, 2014, the entire disclosures of each are incorporated herein by reference.

Also, this application is related to U.S. application Ser. No. 14/625,187 entitled "Active Optical Combiner for CATV Network" filed Feb. 18, 2015, the entire disclosures of each incorporated herein by reference.

BACKGROUND

Although cable television (CATV) networks originally delivered content to subscribers over large distances using an exclusively radio frequency (RF) transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately 6 MHz. Subsequent advancements permitted limited return communication from the subscribers back to the content provider either through a dedicated, small low-frequency signal propagated onto the coaxial network. Modern CATV networks, however, provide for not only a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A key benefit of RFoG is that it provides for faster connection speeds and more bandwidth than current coaxial transmission paths are capable of delivering. For example, a single copper pair conductor can carry six phone calls, while a single fiber pair can carry more than 2.5 million phone calls simultaneously. FTTP also allows consumers to bundle their communications services to receive telephone, video, audio, television, any other digital data products or services simultaneously.

One existing impairment of RFoG communication channels is Optical Beat Interference (OBI), which afflicts traditional RFoG networks. OBI occurs when two or more reverse path transmitters are powered on, and are very close in wavelength to each other. OBI limits upstream traffic, but also can limit downstream traffic. Existing efforts at mitigating OBI have focused on Optical Network Units (ONUs) at the customer premises, or on the CMTS at the head end. For example, some attempts to mitigate OBI make the ONUs wavelength specific while other attempts create an RFoG-aware scheduler in the cable modem termination system (CMTS). Still others attempts have included changing ONU wavelengths on the fly. Due to the fundamental nature of lasers and Data Over Cable Service Interface Specification (DOCSIS) traffic, none of the above techniques yield satisfactory results as wavelength collisions still occur or cost is high.

Thus, it may be desirable in RFoG deployments to further reduce or eliminate OBI.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

DETAILED DESCRIPTION

Figure 1:
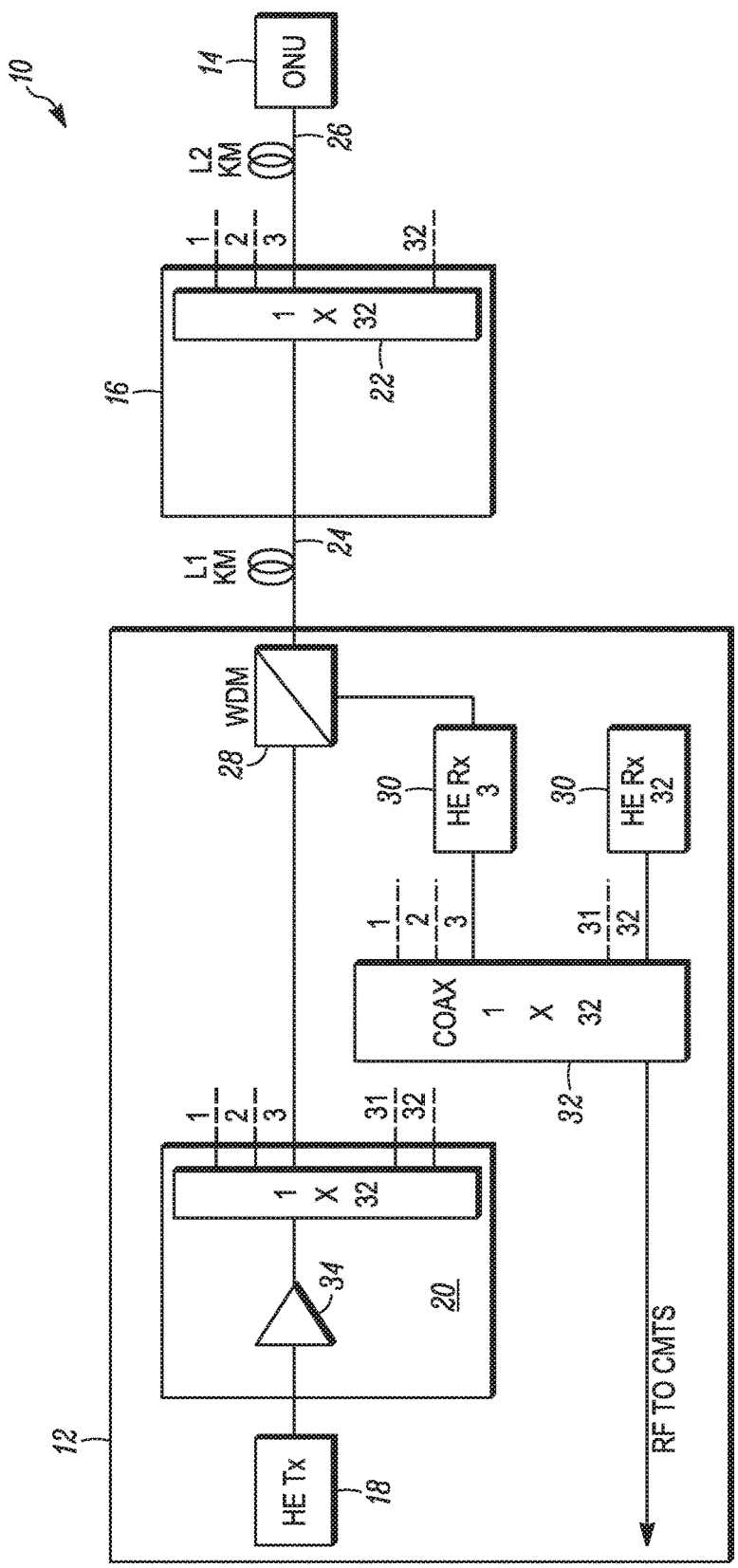
FIG. 1 depicts a radio frequency over glass (RFoG) architecture.

Configuring optical network unit (ONU)s to receive signals at different wavelengths may facilitate the prevention or elimination of OBI. Disclosed herein are techniques for adjusting a wavelength at an ONU by providing information to the ONU to perform the adjustment. The disclosed techniques may include the ONU identifying the port of a splitter to which the ONU is connected in order to make wavelength adjustments. Various techniques are described herein to enable the ONU to identify from which port the ONU is receiving signals. For example, as described in more detail below, a splitter that splits signals to ONUs in a cable network may signal to one or more ONUs the port to which it is connected. The splitter may perform the signal function by harvesting optical power from optical power provided to the splitter. In this manner, an active splitter may behave passively or in a passive mode with respect to the receipt of power, not requiring remote power, such as remote electrical or remote optical power, to perform the signaling to the ONU. Thus, a splitter lacking electrical power may be able to harvest power for signaling information to the ONU for OBI prevention, functioning as an optical combiner with energy harvesting. The amount of power scavenged may be a small fraction of available optical power present within the combiner to transmit signals. In the absence of any remote optical powering or any specific provision of optical power to power the splitter, the scavenged portion of existing optical signal power input is made useful by the disclosed techniques.

Modern cable television (CATV) transmission systems have replaced much of the legacy radio frequency (RF) transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end may receive the respective RF content signals, multiplex the signals using an RF combining network, convert the combined RF signal to an optical signal (e.g., by using the RF signal to modulate a laser) and output the optical signal to a fiber-optic network that communicates the signal to one or more nodes, each proximate to a group of subscribers. The node may then reverse the conversion process by de-multiplexing the received optical signal and converting it back to an RF signal so that it can be received by viewers.

Improvements to CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A benefit of RFoG is that it provides for faster connection speeds and more bandwidth than current coaxial transmission paths are capable of delivering. For example, a single copper pair conductor can carry six phone calls, while a single fiber pair can carry more than 2.5 million phone calls simultaneously. FTTP also allows consumers to bundle their communications services to receive telephone, video, audio, television, any other digital data products or services simultaneously.

In telecommunications, radio frequency over glass (RFoG) is a deep-fiber network design in which the coax portion of the hybrid fiber coax (HFC) network is replaced by a single-fiber passive optical network (PON). The Society of Cable and Telecommunications Engineers (SCTE) has approved standards for implementing RFoG, also approved by the American National Standard Institute (ANSI).

An RFoG topology may include an all-fiber service from the headend to a field node or optical network unit (ONU), which is typically located at or near the user's premises. In a cable network headend, a downstream laser may send a broadcast signal that is optically split multiple times. The optical network unit, or ONU, recovers the RF broadcast signal and passes it into the subscriber's coax network. Downstream and return-path transmission use different wavelengths to share the same fiber (typically 1,550 nm downstream, and 1,310 nm or 1,590/1,610 nm upstream). The return-path wavelength standard is expected to be 1,610 nm, but early deployments have used 1,590 nm. Using 1,590/1,610 nm for the return path allows the fiber infrastructure to support both RFoG and a standards-based PON simultaneously, operating with 1,490 nm downstream and 1,310 nm return-path wavelengths. Both RFoG and HFC systems can concurrently operate out of the same headend/hub, making RFoG a good solution for node-splitting and capacity increases on an existing network.

RFoG allows service providers to continue to leverage traditional HFC equipment and back-office applications with the new FTTP deployments. For example, cable operators can continue to rely on the existing provision and billing systems, Cable modem termination system (CMTS) platforms, headend equipment, set-top boxes, conditional access technology and cable modems while gaining benefits inherent with RFoG and FTTx.

FIG. 1 shows an exemplary RFoG system 10, where a head end 12 delivers content to an ONU 14 at a customer's premises through a node 16. An RFoG topology includes an all-fiber service from the headend 12 to a field node or optical network unit (ONU), which is typically located at or near the user's premises. In the headend 12, a downstream laser sends a broadcast signal that is optically split multiple times. The optical network unit 14, or ONU, recovers the RF broadcast signal and passes it into the subscriber's network, which may be coaxial or also upgraded with fiber communication.

The head end 12 may include a transmitter 18 that delivers a downstream signal to one or more 1×32 passive splitters 20 that includes 32 output ports, each output port connected to a wavelength division multiplexer (WDM) splitter 28 that delivers the downstream content over a fiber transmission segment 24 to the node 16. The node 16 may include another 1×32 splitter 22, where each output port of the splitter 22 is connected via another fiber segment 26 to a particular ONU 14 at a subscriber's premises.

Optical networking units (ONUs) in an RFoG environment may terminate the fiber connection at a subscriber-side interface and convert traffic for delivery over the in-home network at the customer premises. Coaxial cable can be used to connect the ONUs of an RFoG network to one or more user device, wherein the RFoG user devices can include cable modems, EMTAs, or set-top boxes, as with the user devices of an HFC network. For example, an R-ONU may connect to set-top boxes, cable modems, or like network elements via coaxial cable, and one or more of the cable modems may connect to the subscriber's internal telephone wiring and/or to personal computers or like devices via Ethernet or Wi-Fi connections.

Those of ordinary skill in the art will appreciate that the foregoing architecture is illustrative only. For example, the number of ports of the splitters 20 and 22 may be changed, as desired. It should also be understood that the head end 12 may include more splitters 20, each splitter having outputs connected to a respective node so as to serve a great number of subscribers.

Along the return path from the subscriber's ONU 14 to the head end, the splitter 22 operates as a combiner, i.e. for a 1×32 port splitter/combiner 22, up to 32 ONUs may deliver return path signals to the node 16, which combines them for upstream transmission along fiber length 24. Each of the signals from the respective fiber links 24 is then separated from other signals by the WDM 28 to be received by a separate receiver 30 in the head end 12. The signals from the respective receivers are then combined by a combiner 32 for transmission to a Cable Modem Termination Service (CMTS) in the head end 12. The signals are combined in the RF domain in the headend 12 by the combiner 32, before being connected to the CMTS upstream port. Combined with the forward power limit on the fiber, the combined signals may require one forward fiber 24 (L1 km) per group of 32 subscribers.

In the forward direction, the forward transmitter is provided to a higher power multi-port amplifier that distributes power. For example, in the head end 12, the transmitter 18 provides output to an Erbium Doped Fiber Amplifier (EDFA) 34 that internally distributes power over the 32 outputs of the combiner 20, each output operated at a relatively high power, e.g. approximately 18 decibel-milliwatts (dBm). The WDM 28 may transmit 1550 nm light from the EDFA 34 in the forward direction and direct reverse light, typically at 1610 nm or perhaps 1310 nm in the reverse direction to the receivers 30. The WDM 28 may be connected to a fiber of length L1 that feeds the splitter 22 in the node 16.

The outputs of the splitter 22 may each be provided to second fibers of length L2 that are respectively connected to ONUs 14 at the subscriber homes. In embodiments, L1+L2 may be up to 25 km. The ONUs 14 convert the forward transmitted light to RF signals for the in-home coaxial network. In the return direction, the ONUs 14 may also receive RF signals from the in-home network and modulate these signals onto a laser, operating at 1610 nm for example, and the laser's output is sent upstream into the fiber L2. The upstream signal may be combined with other upstream signals in the combiner 22 and transmitted further upstream in the fiber L1. At the WDM 28 the upstream signals are directed towards the head end receivers 30.

The loss budget for 32 subscribers and 25 km of fiber requires one receiver in the head end 12 for every group of 32 subscribers; given an upstream transmission power of 3 dBm, the receivers 30 and the WDM 28 may typically operate at a power between −18 and −21 dBm, making a good signal to noise ratio challenging, such that band limited receivers are usually required for acceptable performance. Furthermore, the optical combiner 22 may be passive and combine multiple optical inputs to a single output. Thus, by definition the optical combiner 22 will create OBI between these inputs, as described earlier and will therefore create noise in the RF domain at the head end receivers 30. Furthermore, assume a loss of around 24 dB in the forward path; for an EDFA output power of 18 dBm per port this provides −6 dBm power to the receivers. This is sufficient for acceptable performance at the ONU to 1 GHz, provided low noise high gain receivers are used.

From a splitter that distributes light to subscribers and combines return light from the subscribers at a penalty, there can be a long link (e.g., up to 25 km with an additional 6 dB of loss) back to a headend or hub where the combined return sources are detected at a receiver. The total loss is high such that the receiver SNR is degraded. Furthermore, typically up to 8 receiver outputs are combined onto on CMTS return port that thus handles around 256 subscribers. In this combining, the receiver thermal noise adds up and unless means are implemented on the receivers to turn them off in the absence of signal the SNR is degraded by a further 9 dB. With such means the SNR is still degraded by up to 6 dB when up to 4 return transmitters are on simultaneously, a valid operation mode of the return network.

The phenomenon of optical beat interference (OBI) may occur in RFoG systems when two return transmitters hit a receiver simultaneously on the same wavelength. In a cable system, for example, this condition that may cause OBI can easily occur in multiple-dwelling unit (MDU) applications of DOCSIS-based systems with bonded upstream channels. Optical Beat Interference (OBI) is a signal degradation that occurs when two or more lasers with closely-spaced optical frequencies transmit simultaneously from two ONUs.

The disclosed techniques for eliminating OBI are desirable, and the disclosed manner for eliminating OBI may enable higher capacity in the upstream and downstream. Further, the disclosed splitter/combiner and features of the combiner may enable RFoG coexistence alongside traditional HFC/D3.1 systems and future potential PON systems. The elimination of OBI is critical in some systems to unlock the vast potential of the optical fiber. Described in more detail herein are embodiments for an architecture that incorporates the disclosed optical combiner system with a self-configuring ONU.

Figure 2:
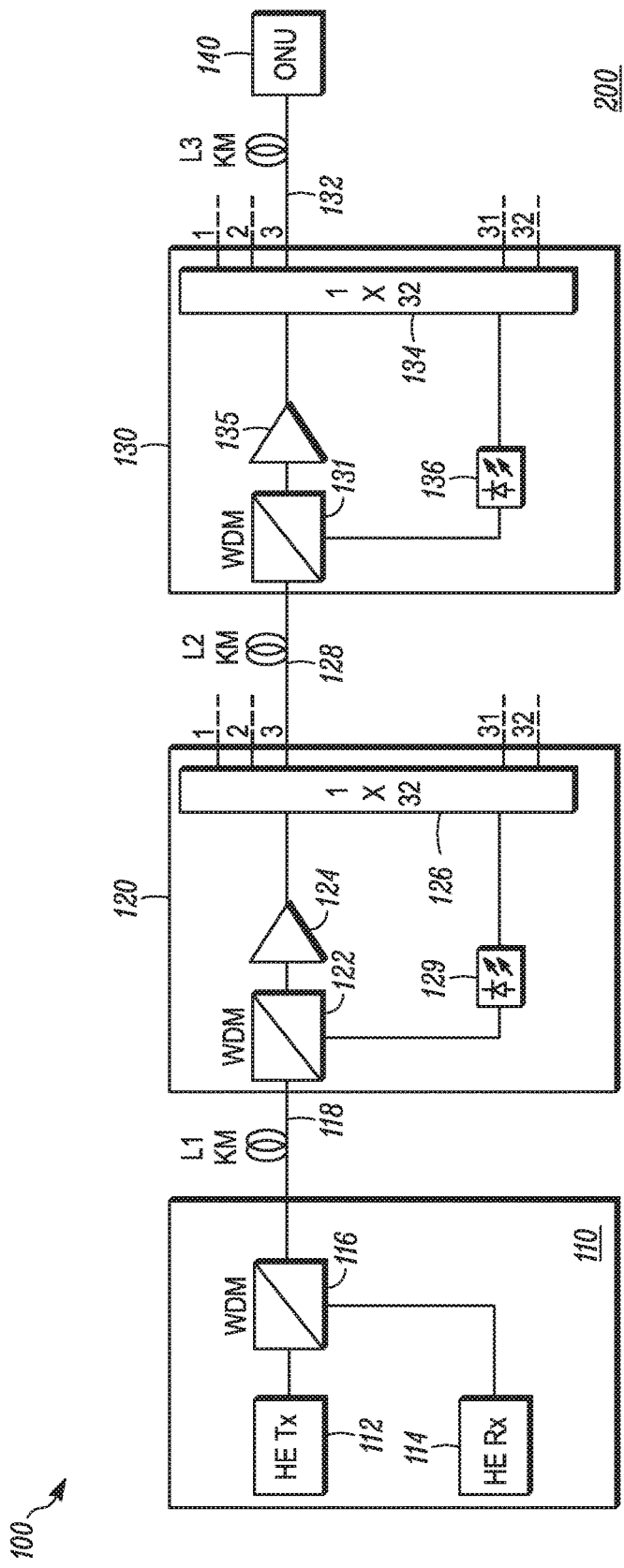
FIG. 2 shows an RFoG architecture improved in accordance with the disclosed techniques.

FIG. 2 shows an improved system 100 for delivering content, e.g., CATV content, to a plurality of subscribers over a network, such as the RFoG network described above. The architecture includes a head end 110 having a transmitter 112 and receiver 114, each connected to a WDM splitter 116 that outputs a signal to, and receives a signal from, a fiber link 118 of L1 km. The fiber link 118 is connected to an active splitter/combiner unit 120. The splitter/combiner unit 120 may include a WDM 122 that may separate forward path signals from reverse path signals. The forward path signal from the WDM 122 is provided to an EDFA 124 that outputs an amplified optical signal to an active 1×32 splitter 126 that has 32 output ports communicable to respective second fiber links 128. At each port, the power level is modest, in the 0-10 dBm range.

In the reverse direction, the 1×32 port splitter 126 operates as an active combiner 126, and includes a WDM per port directing upstream light to a detector that converts the received optical signal to an electrical signal and amplifies it in the RF domain and provides the electrical signal to a transmitter 129 that outputs light at, for example, 1610 nm, 1310 nm, or some other appropriate wavelength, provided to the WDM 122, which in turn directs the upstream light into fiber 118. At the head end, the fiber 118 is connected to WDM 116 that directs the upstream light to the receiver 114.

Each of the 32 ports of the splitter/combiner 126 output, through a respective fiber 128, outputs a respective signal to a second active splitter/combiner unit 130, which may be of the same type and configuration as the splitter/combiner unit 120. The length(s) of the fiber 128 may vary with respect to each other. The output power per splitter port is low, around 0 dBm. The splitter ports are connected to ONUs 140, for instance in a Multiple Dwelling Unit (MDU) or a neighborhood, via fiber 132 of length L3. In a basic RFoG system, the sum of the fiber lengths L1+L2+L3 is up to 25 km. The system 100, however, will permit a higher total length of fiber between the head end and the ONUs, such as 40 km, because the system 100 can tolerate a higher SNR loss, as further described below.

The upstream signals from the ONU 140 may be individually terminated directly at the active splitter/combiner unit 130. Even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 are almost 40 dB higher than in existing RFoG systems. As a consequence, the receiver noise figure is not critical and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110. Although the repeated re-transmission may lead to some incremental reduction in SNR, improvements in SNR from the active architecture provide much greater overall performance relative to traditional RFoG systems. More importantly, because all reverse signals may be individually terminated at separate detectors, such as a multiple detector receivers in a transmission line detector structure within combiner/splitter units 126 and 134 and the signals re-transmitted at upstream lasers transmitters 129 and 136, there can be no optical beat interference (OBI) between different reverse signals. The reverse signals are not combined optically, i.e., the reverse signals are individually detected and electrically summed in detector transmission line structures in 126/134, hence OBI cannot occur.

In the forward direction there may be multiple EDFAs, e.g., 124, 135; these EDFAs are cost effective single stage devices with low power dissipation—typically 2 Watts or less. Cascading the EDFAs result in an accumulation of noise due to the finite noise figures of the EDFAs. Whereas the active splitter architecture does not require the EDFAs (the high power head end 110 EDFA (not shown) could still be used to provide power to the ONUs 140) the use of EDFAs 124, 135 inside the active splitter units provides some advantages. For example, the complexity and power dissipation of equipment in the head end 110 is greatly reduced, as is the fiber count emanating from the head end 110. The amount of power delivered to the ONUs 140 is readily increased from a typical −6 dBm to approximately 0 dBm. As a consequence, ONU receivers obtain 12 dB more RF level from their detectors and do not need as high an SNR or gain. Even with relaxed SNR requirements at the ONU receivers, the SNR impact due to EDFA noise is easily overcome due to the higher received power. In addition, more spectrum can be supported in the forward direction with an acceptable SNR relative to current architectures, such as 4 GHz instead of 1 GHz in current RFoG. Hence total data throughput rates can grow significantly without a change in operation to permit for example, services that provide 40 Gbps download speeds and 10 Gbps upload speeds.

As described herein, eliminating OBI is desirable. In order to prevent OBI, ONUs may be set at different wavelengths. However ONUs are unaware of or do not know the wavelength of other ONUs, and also do not know what port of a passive they are connected to hence the wavelength to set the ONU to is not known. Further, there is a demand for splitting a signal, which typically requires 2 or 3 watts of power for a photon harvester to handle. Thus, the appeal of using an active combiner is limited because, for example, for an active combiner to function, 2+ watts of power are needed.

In some embodiments, the optical combiner such as those shown in FIGS. 1 and 2 provides upstream and downstream RFoG capability and a completely transparent and reciprocal avenue for PON transmission. The optical combiner may enable complete transparency for PON deployments. For example, the optical combiner may enable OBI free and high capacity features by deployment in compatible HFC D3.1 capable FTTH networks. Likewise, the optical combiner may be incorporated in to GPON, 1G-EPON, XGPON1, 10G/1G-EPON, 10G/10G-EPON. The compatibility with HFC and D3.1 enables the disclosed optical combiner to be deployed alongside a current HFC network, and is D3.1 ready. The optical combiner may be deployed on a fiber node, on multiple dwelling unit (MDU) and on single family home (SFU) deployments.

Embodiments for an RFoG combiner include preventing or eliminating OBI at the combiner as opposed to managing it at the extremities of the network (such as using a CMTS scheduler at the headend side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks.

The disclosed optical combiner may be independent of ONUs, Cable Modems and CMTSs. The disclosed optical combiner may be CMTS agnostic, thus relieving the burden of creating an RFoG aware scheduler that is both restrictive and time consuming. The optical combiner assists to make a cable version of FTTH more feasible, as compared to the PON alternatives. For example, in embodiments, the disclosed optical combiner has a reciprocal PON Pass thru capability of the optical combiner along with a high upstream and downstream capacity, which assists RFoG deployment without interruption to the underlaid system or impairment to future inclusion of PON functionality, such as later PON deployment on an RFOG system.

In some embodiments, the optical combiner has 32 ports, but only requires one transmit port, one receive port, and one WDM component at the headend. Thus, instead of requiring 32 WDMs and 32 receive ports, the disclosed optical combiner may save on head end space and power. The combiner may be an active device that needs approximately 2 Watts of power. The optical combiner may be powered by power sources readily available in the RFoG system, or power can be provisioned in to the optical combiner. The power source may include a battery back-up or solar/fiber power alternatives. If the power is lost and the battery has also drained, the entire reciprocal PON transmission is unaffected. The upstream RFoG transmission is however stopped. In a conventional RFoG system it would have been stopped also because the preponderance of OBI would have severely impaired the system anyway if the system was a traditional RFoG system with a passive combiner. Also in case of a power loss ONU (Optical Networking Unit) at the homes would cease to function such that without any power backup such systems will cease to function, whether those are RFoG or PON systems, with or without the active combiner disclosed here. The headend optical receiver may only need an input power range from 0 . . . −3 dBm, and require 15 dB less RF output power due to the absence of the RF combiner such that with such a high optical input power and low RF output power requirement the gain can be low.

The disclosed optical combiner may preferably eliminate OBI, making an OBI-free system. The optical combiner enables long reach and large splits, e.g., Up to 40 km and 1024 Splits, which will expand even further. The high upstream and downstream capacity enabled by the disclosed optical combiner includes up to 10G DS/1G US, and as high as 40G DS/10G US.

In embodiments, the disclosed optical combiner prevents interference in RFOG deployments in the combiner rather than preventing interference using measures taken in the ONU where previous attempts have failed or proven to be cost-prohibitive.

Traditional RFoG architectures have a fixed power budget. This means that as fiber length between the head end and the ONUs increases, a smaller number of splits may be used. Conversely, the more splits that are desired, the less fiber length may be deployed. The disclosed active architecture, however, enables fiber length of up to approximately 40 km irrespective of the number of splits used, meaning that the disclosed active architecture permits fiber lengths of 40 km or more along with a large number of splits, e.g. 1024, thereby advancing FTTP topology and deployment.

The overall cost of the active splitter architecture shown in FIG. 2 is similar to that of a traditional RFoG solution. The cost of active splitter EDFA gain blocks and WDM and detector components in the active architecture is offset by the elimination of head end gear such as receivers, high power EDFAs and combiners. A cost reduction of the ONUs that can operate with lower output power further supports the active splitter architecture. Further advantages of the active splitter architecture may include a reduction in outgoing fiber count from the head end, which can have a large impact on system cost, as well as an option to use 1310 nm reverse ONUs while staying within a typical SNR loss budget, which can further reduce costs. Also, the system shown in FIG. 2 exhibits increased bandwidth relative to what existing RFOG architectures are capable of providing, avoiding limits on service group sizes and concomitant requirements for more CMTS return ports. Finally, unlike OBI mitigation techniques in existing RFoG architectures, the system shown in FIG. 2 does not require cooled or temperature controlled optics and bi-directional communication links that necessitate additional ONU intelligence.

Each of these factors provides a further cost advantage of an active splitter solution over existing RFoG architectures. Required space and power in the head end is also reduced; the active splitter solution requires one transmit port, one receive port and one WDM component. Existing RFoG architectures, on the other hand, requires transmit ports, multi-port high power EDFAs, 32 WDM's, 32 receiver ports, and a 32-port RF combiner. Existing RFoG architectures require very low noise, high gain, and output power receivers with squelch methods implemented to overcome power loss and noise addition in the RF combiner. The system 100 shown in FIG. 2, conversely, works with input power normally in the 0-3 dBm range, little gain is required, and requires 15 dB less power output due to the absence of the RF combiner before the CMTS.

The disclosed optical combiner unit may be independent of ONUs Cable Modems and CMTSs. The disclosed optical combiner may be CMTS agnostic, thus relieving the burden of creating an RFoG aware scheduler that is both restrictive and time consuming. The optical combiner assists to make a cable version of FTTH more feasible, as compared to the Passive Optical Network (PON) alternatives. For example, the disclosed optical combiner unit may have a reciprocal PON pass-thru capability of the optical combiner unit along with a high upstream and downstream capacity, which assists RFoG deployment without interruption to the underlying system or later PON deployment on an RFoG system.

Preferably, the disclosed optical combiner unit implements a transmission line approach to combine multiple optical photodetectors in a single optical receiver. This may be accomplished in unidirectional or bidirectional configurations. A unidirectional system provides no control communication signals from an active optical splitter to an ONU, i.e. control communication signals only pass from an ONU to an active splitter. Thus, in a unidirectional system, an active optical splitter simply accepts an output level from an ONU and operates with that output level. A bidirectional system passes control signals from an active optical splitter to ONUs instructing them to adjust their output power; this type of system permits accurate equalization of the input levels to the active optical splitter from each ONU.

Some active splitter/combiner systems may preferably include redundancy where active optical splitters switch their return laser power (the return laser that carries the combined information of the ONUs connected to it) between a high and a low power state or operates this laser in CW mode. In that case an upstream head end or active optical splitter can easily detect loss of power at an input port and enable a second input port connected to another fiber route to receive the information, in the forward path the other fiber route would also be activated in this case because generally the forward and reverse light share the same fiber. Also, some active splitter/combiner systems may include a reverse laser in the active optical splitter that adjusts its power output as a function of the number of ONUs transmitter to the active optical splitter and the photocurrent received from these ONUs. Still other active splitter/combiner systems may have a gain factor and reverse laser power of the active optical splitter set to a fixed value.

Preferably, the disclosed optical combiner unit is able to configure itself under changing circumstances. Instances occur in which cable modems in the ONU are required to communicate with the CMTS even if there is no data to be transmitted. Usually, however, the ONU is turned off during periods when there is no data to be transmitted between the ONU and CMTS, and a cable modem could go hours before receiving or sending data. Thus, in some embodiments the disclosed combiner unit may be configured to stay in communication with the CMTS. Cable modems may be required to communicate back to the CMTS once every 30 seconds, or some other appropriate interval.

Disclosed herein are techniques for eliminating power requirements in a combiner but still preventing or eliminating OBI. In other words, the requirement for power may be eliminated, though providing power is still allowed. In embodiments, a photon harvester in an optical combiner has active downstream signaling. In embodiments, the photon harvester provides energy powering a mechanism in the passive combiner that can modulate a downstream light or add a modulated light source to the downstream light being split by the passive combiner. In embodiments, the optical combiner functions as a passive combiner with energy harvesting, and is located between an active splitter 130 and an ONU 140, receiving downstream light from the active splitter and upstream light from one or more ONUs connected to one or more ports of the passive splitter. Note that such a passive splitter does contain active electronics, however it does not require electrical powering so for all intents and purposes it functions as a 'passive splitter' except that it has added signaling capabilities.

As downstream light enters the combiner, a portion of the light is detected by a photodiode and the charge produced in the photodiode is ingested by a capacitor. The capacitor holds its charge, and once completely charged, can discharge the charge on to a PZT driver circuit or to an LED driver circuit, to create modulated light to travel across the active downstream channel. The ONU recognizes the signal and, in response to the signal, can change its wavelength. For example, if the downstream signal output from the photon harvester identifies port 1 as a port that should be operated at wavelength x, the ONU can tune to wavelength x in response to the downstream signal. Thus, the combiner can inform the ONU to which port it is connected.

In response to the downstream signal received by the passive combiner, the ONU can use the information to connect itself directly to a proper port of the combiner and configure itself for the port. The disclosed techniques provide the option to have a single unit, non-active, and completely OBI eliminating passive combiner. Non-active meaning that the splitter does not require electrical power to operate such that to the user it appears as a 'non-active' or 'passive' splitter. It can contain active electrical components and it obtains power to operate from harvesting photons of a fraction of downstream light directed at a photodiode. In implementations, embodiments for the disclosed active splitters may be located temporally at an extremity of the network where no power is available. The combination of active splitters and passive splitters with downstream signaling together can provide more enhanced coverage to create an OBI free portion of the network. A passive splitter signals to the ONU what port it is on, the splitter performs the signal function by harvesting optical power from optical power provided to the splitter such that the splitter does not require electrical power and in that sense remains a 'passive' device.

As described in more detail, below, a priori knowledge of the combiner for ONU configuration for communication with the combiner is not necessary, as the ONU is able to employ the disclosed techniques to determine its configuration in a uni-directional manner. The combiner does not require electrical power to communicate its settings to the ONU, and the photon harvester can be used for low speed signaling.

The ONU can configure itself based on various content in the downstream signal. For example, in embodiments, an ONU with a tone input includes an ONU that can listen for tones or frequency-shift keying (FSK) signals to determine at what wavelength it should operate. The ONU can receive instructions via the downstream signal to reduce chatter. The ONU can decode signaling informing about the port of an active 1×N splitter to which it is connected. Active/passive splitters for RFoG may include automatic ONU wavelength assignment for NOBI (No OBI) and automatic system mapping. An ONU may signal its current wavelength and identification code for instance by using a FSK (Frequency Shift Keying) to an upstream passive splitter or active splitter. Whereas the passive splitter may simply pass the signal upstream, an active splitter may interpret the signal. Since the active splitter can detect at what port the signal was received it can map the identification code of ONUs to its ports. In case a passive splitter with power harvesting that instructs the ONU to pick a particular wavelength depending on the passive splitter port was involved then the wavelength chosen is an indication of the port number of the passive splitter that the ONU was connected to. Thus the system can be automatically mapped.

In embodiments, the ONU has a tone output. The ONU can label its output signal with a tone or FSK signal representing its current wavelength. The ONU can also listen for tones or FSK signals to discover at what wavelength other ONUs are operating. In embodiments, the ONU can adjust its wavelength to avoid wavelengths taken by other ONUs. In embodiments, the ONU can follow a statistical scheme wherein it reacts only to a fraction of signals indicating a wavelength conflict. In embodiments the passive splitter may reflect a fraction of upstream signaling back to ONUs such that ONUs can receive wavelength labels from other ONUs connected to that passive splitter. Wavelength labels may be, for instance, tone signals encoding information such as a wavelength at which another ONU is operating.

The ONU may be configured to generate or identify OBI detect signals. For example, the ONU can keep track of its own activity to determine if it could cause an OBI event, and/or the ONU can listen for tones or FSK signals to discover if an OBI event has taken place. Such signals may be generated by an active splitter configured to detect OBI events and signal detection of such events downstream to ONUs. The ONU can adjust its wavelength if an OBI event has been signaled that it could have caused. The ONU can follow a statistical scheme wherein it reacts only to a fraction of such events.

In embodiments, the ONU is connected to an active splitter with FSK transmission capability. The ONU can keep track of its own activity to determine if it is part of a current event. For example, the ONU can listen for tones or FSK signals to decode information sent downstream by an active upstream device in response to ONU activity. Such downstream information may include a list of currently active upstream ports at the active splitter. The ONU can discover the port of that upstream device that it is connected to by correlating to its own activity. The active splitter may also signal wavelength label information that it has received from ONUs at ports to downstream ONUs. The ONU can adjust its wavelength if a wavelength conflict is signaled with another ONU at the same port, particularly when the ONU receives a wavelength label identical to its own label at the port that it is connected to when the ONU itself was not active at that time. The ONU can follow a statistical scheme wherein it reacts only to a fraction of such events FIGS. 3A and 3B below depict embodiments of ONUs configured to listen to FSK.

Figure 3B:
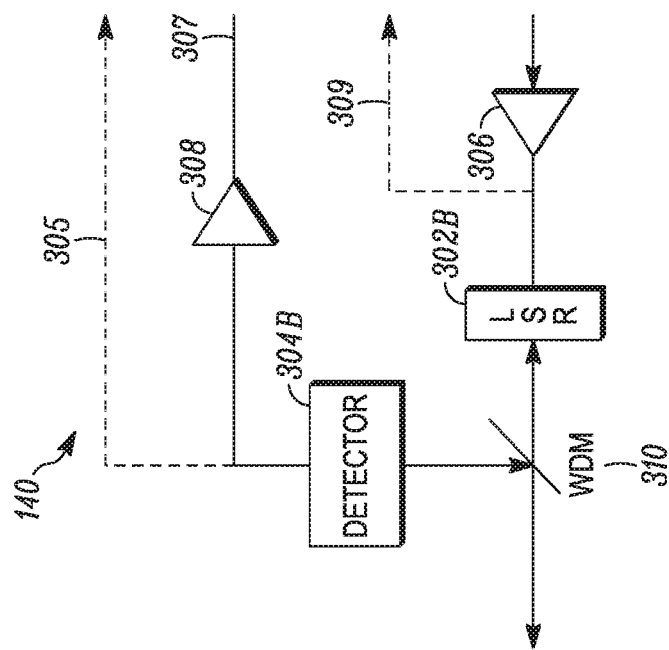
FIG. 3B illustrates another embodiment for an optical network unit (ONU) configured to listen to a forward wavelength signal passed through a wave division multiplexer.
Figure 3A:
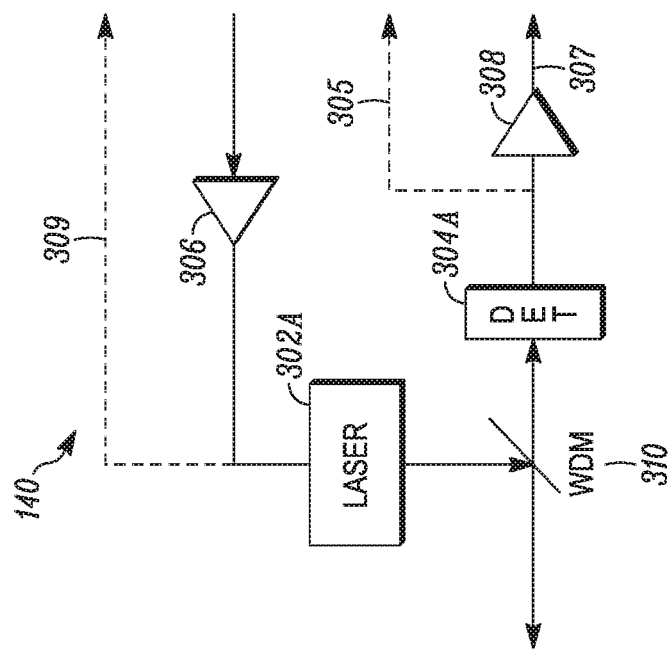
FIG. 3A illustrates an embodiment for an optical network unit (ONU) configured to listen to a forward wavelength signal passed through a wave division multiplexer.

FIG. 3A illustrates an ONU configured to listen to a forward wavelength signal 307 passed through the WDM device 310 to the detector 304 through the RF path amplifier 308 or picked up before the amplifier 308 (dashed signal 305) for low frequencies. As described above, the ONU 140 can be configured to listen to other wavelengths through the leakage through the WDM component 310 to the detector 304 (can be as much as −15 dB). The ONU 140 may be configured to listen to reflection of wavelengths 309 by the WDM device 310 to the laser 302 by using the laser 302 a photodiode when the laser is off (dashed line). The reflection of wavelengths by a WDM device 310 may be strongest in wavelengths selected by the WDM device 310, and weaker for other wavelengths (−40 dB or more attenuation). The laser 302 can be slightly reverse-biased to improve response when used as a photodiode. FIG. 3B illustrates the concepts in FIG. 3A, but with the WDM 310 used such that leakage of wavelengths to the laser is larger (−15 dB). In FIG. 3A, WDM component 310 passes light to the detector 304A, and in FIG. 3B the WDM 310 reflects light to the detector 304B in FIG. 3B. Thus, the WDM component 310 reflects light to and from the laser 302A in FIG. 3A and it passes light to and from the laser 302B in FIG. 3B.

Figure 4:
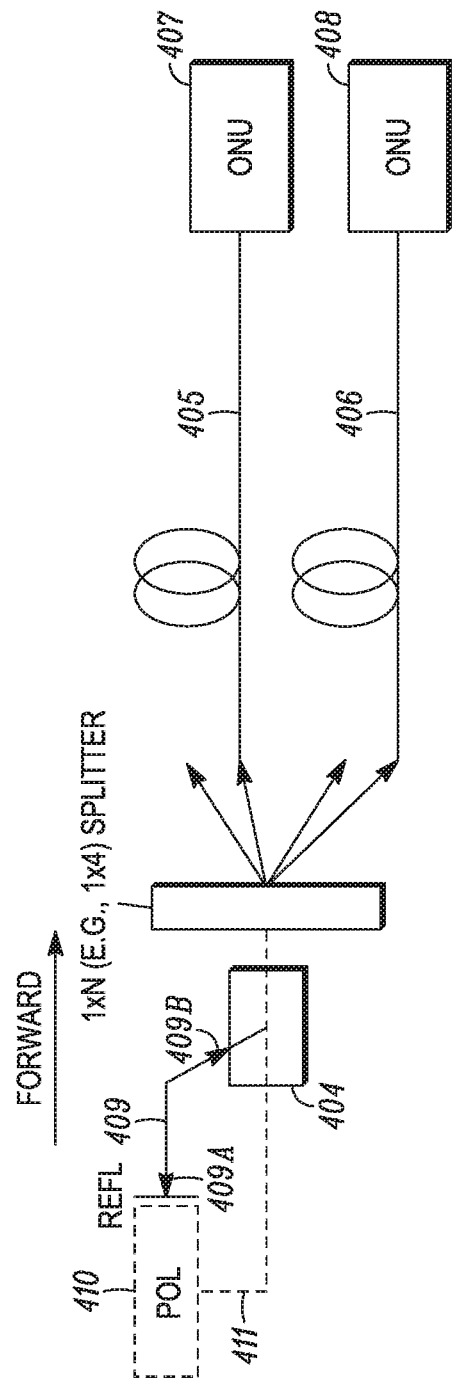
FIG. 4 depicts an embodiment for a 1×N passive splitter with reflection.

FIG. 4 depicts an embodiment for a passive splitter with reflection. For example, FIG. 4 depicts a simple view of the combiner 120 or 130 from FIG. 2 without all components, but for the purposes of illustrating the reflection by the 1×N splitter. In this figure, a 1×N splitter (1×4 in this example) that transmits to ONUs, such as ONU 407 and 408, over respective fibers, such as fiber 405 and 406, respectively, is preceded by a coupler 404. The coupler 404 may couple a small fraction of reverse light 409 (e.g., 10% here) to a reflecting device 410 such that the reverse light is re-injected in the forward direction 411 into the coupler 404. The light directed to the reflector at 409a and the light reflected by the reflector at 409b is opposite in direction.

Thus, when an ONU served by the splitter, e.g. ONUs 407, 408, is active, a fraction of the ONU's light is reflected and distributed over the other ONUs. The other ONUs can then monitor the wavelength indicating tone(s) produced by the active ONU(s) and move their own wavelength setting to prevent conflict. A downside is that the reflection must be weak or else noise is generated due to multiple reflections in the path between ONU (as an imperfect connection may be assumed) and the reflector preceding the splitter. With a perfectly terminated ONU, re-reflection could be suppressed sufficiently and with sufficient isolation the reverse laser would not self-interfere with reflected signals. The reflector 410 may be made polarization dependent (pol) such that the reflection occurs at a polarization state orthogonal to the incoming polarization, for instance by applying similar means as in polarization (in)dependent isolators. This can effectively suppress self-interference of a re-reflected signal.

Figure 5:
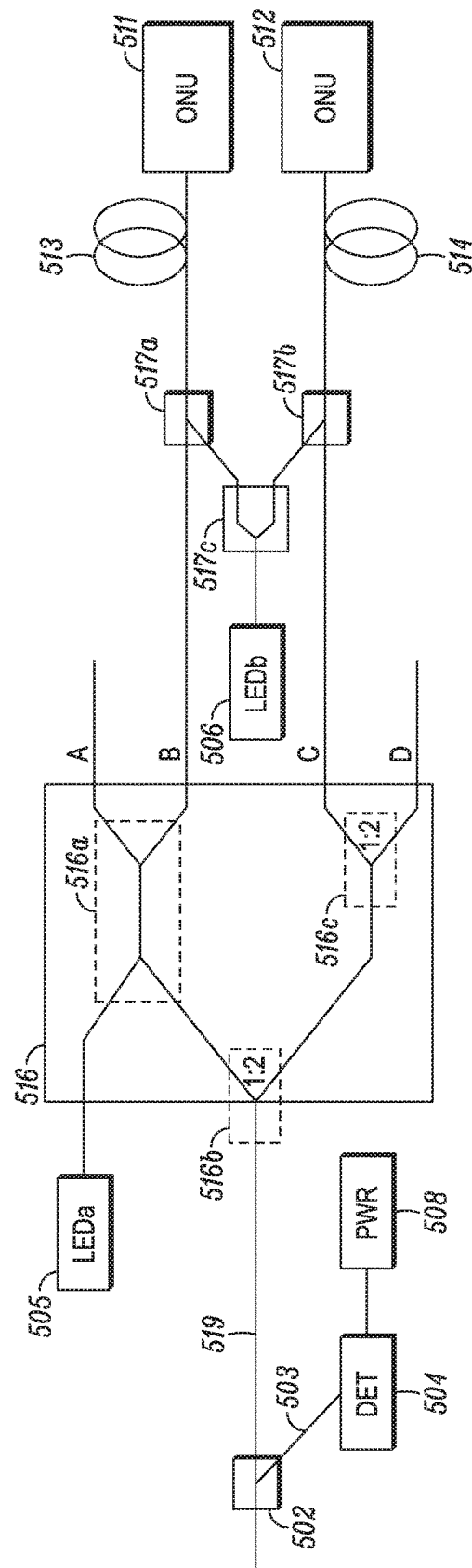
FIG. 5 depicts an embodiment for an active splitter with power harvesting techniques for signaling.

FIG. 5 depicts an embodiment for an active splitter with signaling. The implementation in FIG. 5 does not require electrical power. A 1×N splitter 516 (1x4 here) is preceded by a tap 502 with input 520 and output 519 that couples a fraction of light 503 to a detector 504 feeding a power harvesting circuit (<1 mW) 508. The power harvesting circuit 508 includes detector 504 and power circuit 508. The power circuit 508 can include capacitors and/or batteries. The LEDs 505, 506 may be used to emit light (so they consume power). Thus, the power harvesting circuit can collect power to operate LEDs 505, 506 at low duty cycle each at their own rate, e.g., at 1550 nm. to inject forward signaling into the splitter to tag port information to the port outputs. The ONUs, e.g., ONUs 511 and 512 receiving signals from the splitter over respective fibers 513, 514, read this information and set wavelengths according to their assigned port. LEDa 505 is received by the upper two output ports A,B of this 1×4 splitter 516 with an extra inputs for LEDa. This is accomplished by constructing the splitter 516 using a 2×2 splitter 516a and two 1×2 splitters 516b and 516c. LEDb is divided by splitter 517c and coupled to fibers 513 and 514 and received by the middle two output ports B, C via 10% couplers 517a and 517b after the splitter 517c, the lower port D receives no LED output. For a 1×8 splitter 3 LEDs are needed; N LEDs are needed for a 1×2^N splitter. It should be noted that in upstream direction the splitter 516 acts as a combiner to combine upstream signals sent from the ONUs to put them out at input port 520.

Figure 6:
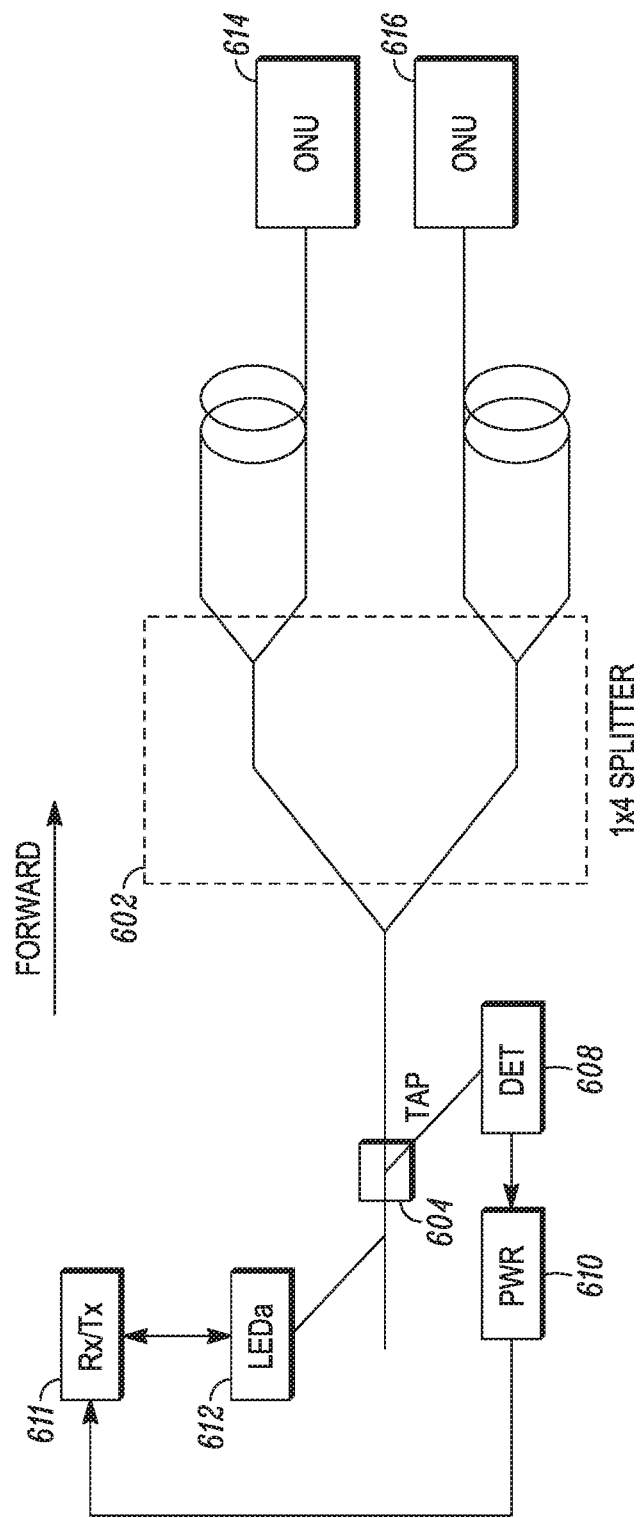
FIG. 6 depicts another embodiment for an active splitter with power harvesting techniques for signaling.
Figure 7:
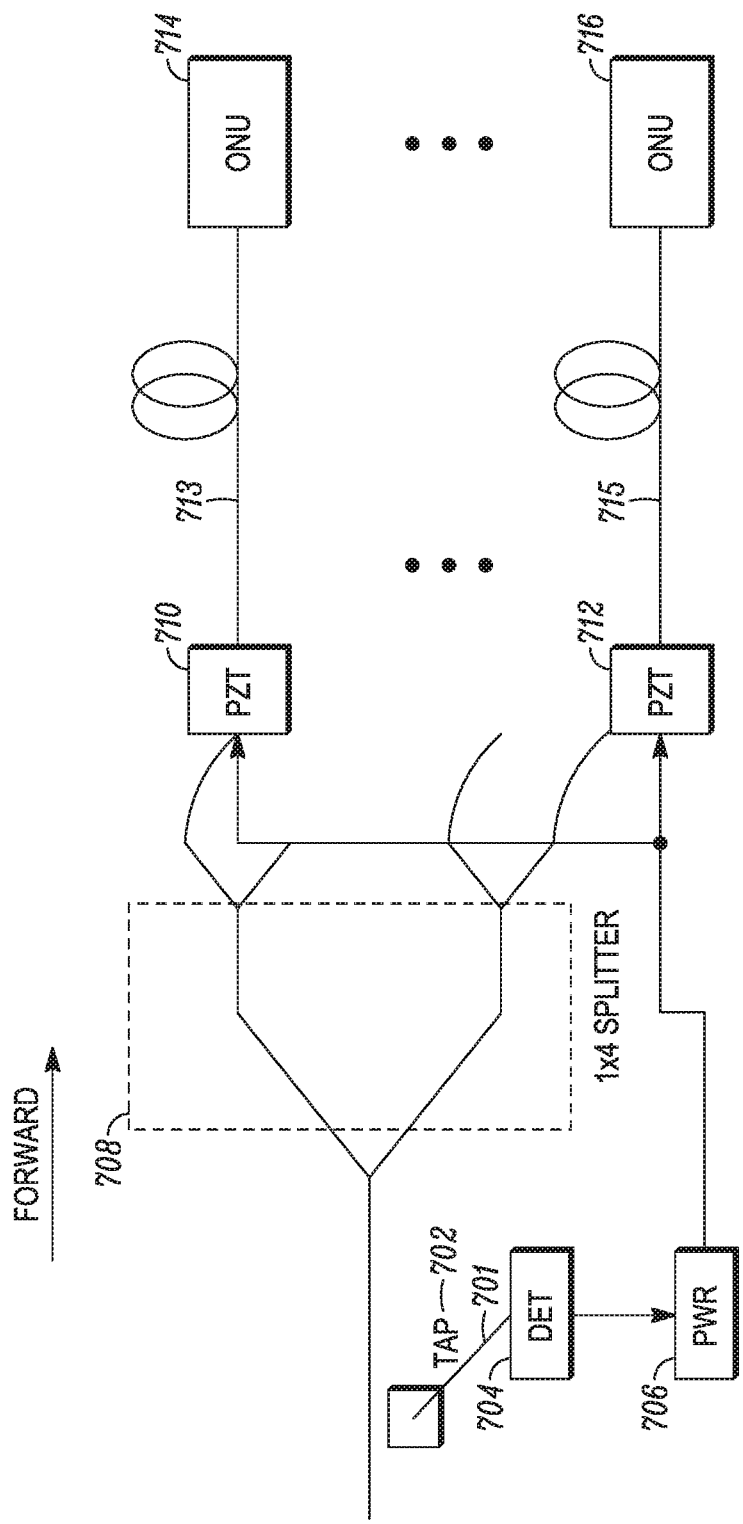
FIG. 7 depicts an embodiment for an active splitter with piezo signaling.

FIG. 6 depicts another embodiment for an active splitter with signaling. The implementation illustrated in FIG. 6 does not require electrical power. A 1×N splitter 602 (1×4 here) is preceded by a tap 604 that couples a fraction of light to a detector 608 feeding a power harvesting circuit 610 (<1 mW). This collects power in a small capacitor for short burst operation (e.g., 10-100 usec duration). The Rx/Tx 611 represents a receive signals resulting from light detected by the LED 612 and transmit signals to the LED 612 that converts these signals to light. The LED 612 is used as a detector that will produce a voltage with a tone/FSK signal when an ONU transmits in reverse direction with such a tone or FSK signal. When sufficient power has been collected the LED 612 is then turned on and answers with information in the forward band as a tone/FSK signal that represents the information that had just been detected on the LED 612. Re-charge time to recover from such a transmission is expected to be in the 1-10 msec range. A small ceramic capacitor of around 10 uF is expected to be sufficient for energy storage. This embodiment is comparable to the passive reflector concept shown in FIG. 4 without a risk for interference due to re-reflection and without a need for the ONU 614, 616 to detect signals that are not in the forward band. The use of an LED 612 prevents OBI with the forward signal and saves power. The LED does not tell the ONU what port it is on, but it does tell other ONUs what wavelength an active ONU is transmitting at so that the other ONUs can move to another wavelength FIG. 7 depicts an embodiment for an active splitter with piezo signaling. The implementation shown in FIG. 7 does not require electrical power. A 1×N splitter 708 (1×4 here) is preceded by a tap 702 that couples a fraction of light 701 to a detector 704 feeding a power harvesting circuit 706 (<1 mW). The power harvesting circuit 706 collects power in a small capacitor for short burst operation (e.g. 10-100 usec duration). During operation piezo actuators (PZT) 710, 712 induce a vibration in a partial or full fiber bend loop (radius ~10 mm order of magnitude) in the output fibers 713, 715. The vibration causes a loss modulation of the forward light that is detected by the ONUs, e.g., ONUs 714, 716. The ONUs 714, 716 have a low frequency signal receiver coupled to the detector in the ONU such as detector 304 in FIGS. 3A and 3B with and output 305 providing a signal to a low frequency receiver. Each fiber 713, 715 is characterized by a specific pattern or frequency, and each ONU 714, 716 sets its wavelength depending on the fiber 713, 715. The Piezo actuators 710, 712 may be of the type used in small speakers, operating on 3V approximately.

Figure 8:
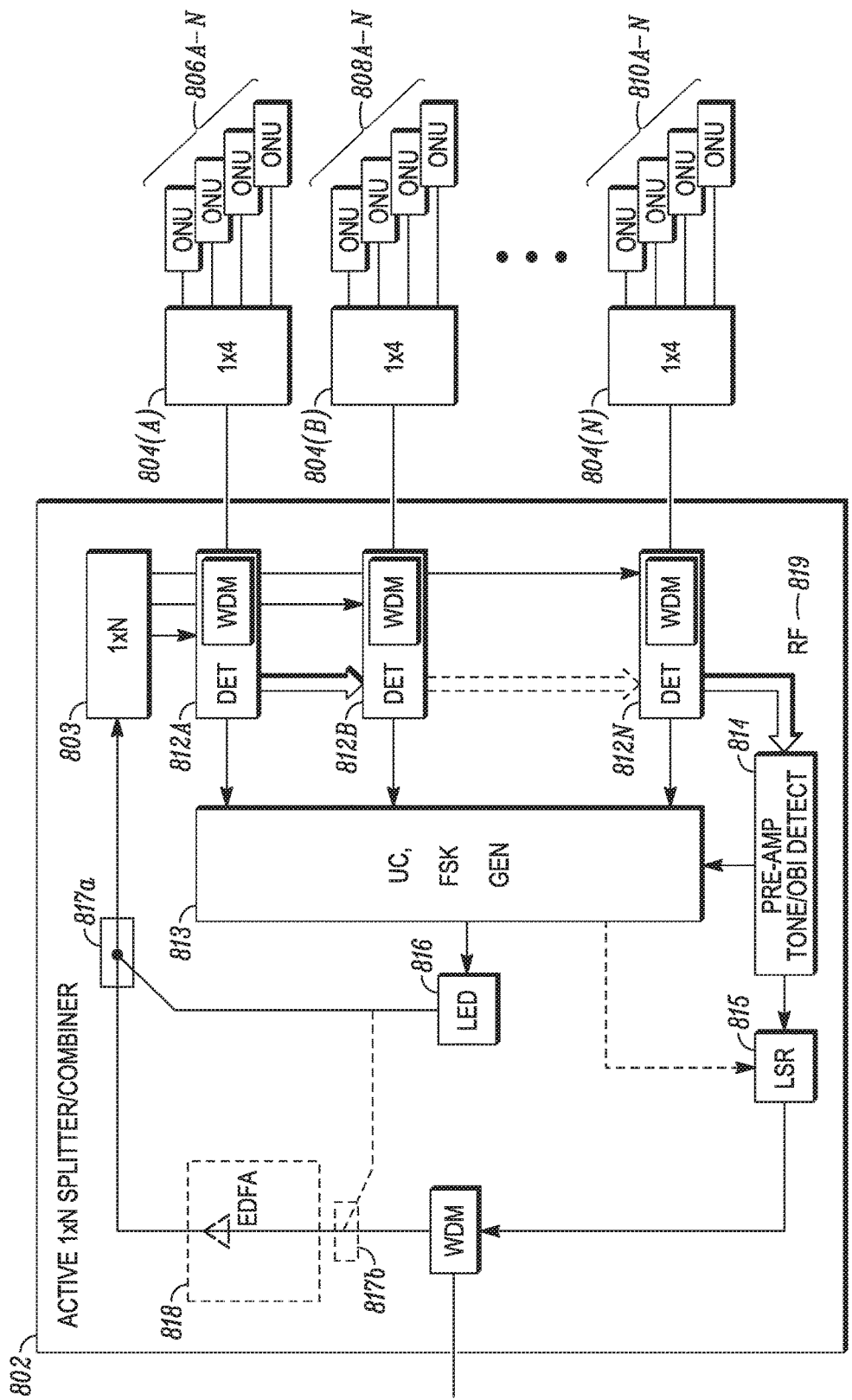
FIG. 8 depicts an embodiment for an active and passive splitter system. It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

FIG. 8 depicts an embodiment for an active and passive splitter system. As shown in FIG. 8, regular passive splitters 804a-804n may follow an active splitter 802. The active splitter 802 has N upstream detectors 812a-n each coupled to a WDM filter and keeps track of which detectors 812a-n receive optical input power. This is done by connections (arrows) from each detector to the micro-controller in block 813. This block contains a microcontroller (uC) with A/D converters that can encode the detector current found at each of the detectors connected to 813. The microcontroller can process the detector currents to determine if these are modulated, for instance with low frequency FSK signals, and decode information encoded in the detector currents. The detectors also put out RF signals; the RF signals are preferably summed in a transmission line receiver structure and put out at an RF port 819.

The output of the RF port 819 can be provided to an RF amplifier 814 that can have additional circuitry to detect tones (such as high frequency FSK signals) or to detect the presence of OBI. Thus the active splitter 802 may also detect tone or FSK signals sent upstream by the ONUs e.g., ONUs 806a-n, 808a-n, 810a-n, at low frequency or in the RF domain. The circuit including a pre-amp, tone/OBI detect 814 can perform this function and OBI detection. The OBI detect function 814 can be realized by detecting noise in the signal to the pre-amplifier and flagging such an event to the microcontroller (uC) 813.

The FSK or tone detected signals may be provided to a microcontroller (uC) 813 with a tone of FSK signal generation capability. The tone or FSK signals can be sent to an LED 816 that provides light to the downstream direction via a coupler 817a, where the downstream signal direction is coupled via 817a to a 1×N splitter 803 that distributes light over the N output ports. The signals from LED 816 can also be sent to the upstream transmitting laser (lsr) 815 that transmits information in the upstream direction.

An EDFA 818 may be present to amplify downstream signals and the LED light from LED 816 can be injected in a coupler 817*b* before the EDFA 818. In embodiments, the ONU e.g., ONUs 806*a-n*, 808*a-n*, 810*a-n*, detects OBI events that have been flagged to the uC 813 and signaled from the uC 813 to the LED 816 that transmitted this information to the ONU. The microcontroller 813 may process OBI detect signals and output a modulation signal to a LED 816 (or laser) (e.g., via connection provided by the 1×N splitter 803) that injects a signal downstream with tone or FSK signaling for the ONUs. The output modulation signal may be injected before or after an EDFA 818 amplifying the forward signal. The embodiment shown in FIG. 8 may work with 1×4 passive splitters already installed in the field, but will work with other splitters of various types, that may be installed in the future. Disclosed is an optical network unit (ONU) for adjusting a wavelength operating with a splitter in an absence of optical beat interference (OBI). The ONU comprises an input for receiving a downstream signal from a splitter optically powered without electrical power, the downstream signal identifying at least one of a port over which the ONU is communicating with the splitter or a wavelength at which another ONU is operating, and a processor for generating an ONU wavelength, wherein the wavelength is adjustable responsive to the downstream signal from the splitter. The ONU may use information in the downstream signal to configure itself for a connection to a port of the combiner, correlating information in the downstream signal to the ONU's activity. The downstream signal identifies a wavelength X for operation over connected port N, the ONU responsive to the downstream signal for tuning to wavelength X. The wavelength chosen is an indication of the port number of the splitter to which the ONU is connected. For the ONU described, the ONU and corresponding port may be used for system mapping.

The ONU can adjust its wavelength to avoid wavelengths taken by other ONUs. The ONU does not require a priori knowledge of combiner for ONU configuration. The ONU determines its configuration uni-directional manner. The ONU may further comprise a tone input for listening for tones or frequency-shift keying (FSK) signals in the downstream signal to determine at what wavelength it should operate. The ONU can decode signaling informing about the port of an active 1×N splitter to which it is connected. The ONU may signal its current wavelength and identification code upstream to the splitter. Responsive to identifying a wavelength conflict with another ONU at the same port, the ONU wavelength is adjustable by the ONU. The downstream signal identifies wavelength labels for other ONUs connected to the splitter for selecting a non-conflicting wavelength. The downstream information identifies currently active upstream ports in use by the splitter.

In embodiments of the active/passive splitter system, the active splitter keeps track of what ports receive upstream signals. As illustrated in FIG. 8, in the downstream communication via the LED the active splitter may provide a tag representing the active upstream port as a tone or FSK signal. In downstream communication the active splitter may embed information about upstream tones or FSK signals or OBI events. When multiple upstream ports are active, the active splitter can tag a transmission as multi-port or "invalid". ONUs discard such "invalid" messages In embodiments of the active/passive splitter system, ONUs filter out and select messages that are not "invalid". ONUs self-learn what port of the active splitter they are on by correlating their own activity with active port messages. ONUs filter messages for their own port to learn about tone or FSK messages sent by other ONUs at the same port. ONUs can receive signals for their own port when OBI events have been detected specific for that port In embodiments of the active/passive splitter system, ONUs adjust their wavelength according to the information received with a tag for their port reporting OBI events or reporting what tone or FSK information other ONUs connected to that port have sent. ONUs may send such tone or FSK signals to report their status, such as wavelength possibly including serial number. The active splitter has a map of what ONU serial number is connected to what port. The active splitter may build such a map and report it back to the headend to automatically build a system map In automatic full system mapping implementations, the large active 1×N splitter, when combined with smaller (non electrically powered) active splitters with signaling may build a complete map of ONUs connected to 1×N splitter and small splitter ports in the system. FIG. 8 illustrates a splitter 804 that may include such power harvesting with an automatic full system mapping implementation. For example, the active 1×N splitter knows what ONUs are active and when, and the active 1×N splitter can monitor chattering ONUs. In response, the headend can instruct such ONUs to shut down for maintenance In embodiments that include cascading active splitters, such as the cascading splitters shown in FIG. 2, the cascaded active splitter may preferably be operated at highest possible input power. Input power coming from a downstream active splitter may vary depending on fiber loss. Noise Power Ratio (NPR) curves of cascaded active splitters may be preferably aligned to overlap. Bidirectional communication can be used to calibrate, and/or a calibration mode can be provided.

In embodiments for detecting and adjusting an input level in the passive/active splitter system, an active splitter may measure current on each input detector of the receiver. FIG. 8 is an example embodiment, depicting the pre-amp/tone/OBI detect circuit that may detect and adjust an input level in the passive/active splitter system, where reporting downstream may be accomplished via the LED 816. In embodiments, the active splitter may measure a level of a calibrated tone received from each downstream active splitter. The level of the calibrated tone, or current, may be reported downstream so that a downstream active splitter can adjust output power and/or modulation index or gain.

In embodiments for entering a calibration mode in the passive/active splitter system, a calibration mode of downstream active splitters may be indicated by a downstream command. Downstream active splitters may randomly turn on with a low duty cycle, and an upstream active splitter can measures detector input power. An upstream active splitter can report measurements to a downstream device, such as an index of port that was active or "multi-port," or a power received on that port. A downstream device that is active may store the port index.

In embodiments for determining settings in a calibration mode in the passive/active splitter system, when all ports have been assigned (passive ports time out if no power received), a processor or microcontroller in the active splitter may compute optimal output power setting for each downstream active splitter, where the weakest link and port receive power limit can determine this setting. The active splitter may send instructions downstream for each port to downstream active splitters (that now know their port numbers) to set these power level. In this manner, downstream devices can adjust gain accordingly to ensure noise power ratio (NPR) curves overlap In embodiments for verifying a calibration mode in the passive/active splitter system, the active splitter may send instructions downstream to turn on ports, such as instructions for cycling through all ports and/or to verify power levels measured. If the verification fails, the procedure may be repeated or time out and report upstream if there are too many failures. The instructions may be sent downstream for all active splitters to switch to normal operation. The active splitter may monitor port levels and report upstream as an element mapping system (EMS) to detect fiber breakage or other degradation of link. The EMS is a type of bidirectional communication system for monitoring and managing elements in the network, such as active splitters and ONUS.

In embodiments for the active/passive splitter system, ONU level is monitored. In embodiments, an active splitter connected to ONU may monitor optical power level per port. The levels may be reported upstream to detect faults. If the ONU embeds tone or FSK labeling of ONU number, then faults can be related to ONU. Using the ONU labeling signals, a full system map can be automatically built. In embodiments, active splitters can also send upstream tone or FSK information to identify splitter In embodiments described herein, the optical combiner provides upstream and downstream RFoG capability and a completely transparent and reciprocal avenue for PON transmission. The optical combiner may enable complete transparency for PON deployments. For example, the optical combiner may enable OBI free and high capacity features by deployment in compatible HFC D3.1 capable FTTH networks. Likewise, the optical combiner may be incorporated in to GPON, 1G-EPON, XGPON1, 10G/1G-EPON, 10G/10G-EPON. The compatibility with HFC and D3.1 enables the disclosed optical combiner to be deployed alongside a current HFC network, and is D3.1 ready. The optical combiner may be deployed on a fiber node, on multiple dwelling unit (MDU) and on single family home (SFU) deployments.

Embodiments for an RFoG combiner include preventing or eliminating OBI at the combiner as opposed to managing it at the extremities of the network (such as using a CMTS scheduler at the headend side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks.

Disclosed are embodiments for an active receiver structure that combines a large number of detectors without bandwidth penalty and provides a better SNR than conventional RFoG. In embodiments, an optical multiplexer structure is designed around the active splitter such that passive PON network operation is not impeded. In embodiments, the active receiver handles RFoG signals, not PON signals.

As described above, conventional implementations use multiple receivers that are RF combined resulting in much higher cost, more power dissipation and poorer noise performance. Optical Beat Interference (OBI) and the limited return link budget are problems in RFoG return networks (see http://www.scte.org/documents/pdf/Standards/ANSI_SCTE_174_2010.pdf for an overview of RFoG networks). In such networks typically a star splitter distributes light over 32 subscribers, the same splitter combines return light from the 32 subscribers at a penalty of 15 dB of loss. The use of multiple receivers is not designed to handle active combining of RF signals and passive PON splitting in one small unit. Also the optical combining of multiple sources at nominally the same wavelength can cause optical beat interference such that the information content can be overwhelmed by noise.

Some embodiments for a photon harvester include techniques for photon harvesting signaling and optical combining that eliminate power in a combiner while maintaining an elimination or prevention of OBI. In embodiments, the photon harvester is located in a passive combiner and harvests optical power from downstream light received at the combiner. A portion of the light is detected by a photodiode and a charge produced in the photodiode is ingested by a capacitor. A downstream signal output from the photon harvester driving a means to modulate an output signal may inform an ONU to which port of the combiner it is connected and/or cause an ONU to changes its wavelength and/or cause the ONU to configure itself to the port to which it is connected.

In embodiments for the combiner described herein, the combiner is a single SKU, non-active, and completely OBI eliminating passive combiner.

In embodiments for use with the combiner described herein, the ONU lacks a prior knowledge regarding the combiner and the configuration needed to communicate with the combiner.

In embodiments for the combiner described herein, the combiner communicates settings to the ONU in a passive manner without using electrical power.

Some embodiments for the combiner described herein include a PZT driver circuit that accepts charge discharged from a capacitor for traveling across an active downstream channel. The PZT driver drives a Piezo element that flexes a downstream fiber such that the optical loss of the fiber is modulated. Thus the intensity of downstream light is modulated resulting in a signal to the ONU. The signal sent downstream from the PZT driver circuit is recognizable by the ONU and, in response to the signal, the ONU determines whether to change its wavelength and/or the signal causes the ONU to set its wavelength depending on a fiber characterized by a pattern or frequency in a signal induced by the PZT driver circuit.

Some embodiments for the combiner described herein include an LED driver circuit that accepts charge discharged from a capacitor for traveling across an active downstream channel. In embodiments, LEDs operate at low duty cycles to inject forward signaling into a splitter with port information. The information is passed downstream to an ONU in a downstream signal, the downstream signal causing the ONU to determine whether to change its wavelength and/or the signal causes the ONU to set its wavelength according to an assigned port.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

We claim:

1. An optical network unit for adjusting a wavelength operating with a splitter in an absence of optical beat interference (OBI), the optical network unit comprising:
   an input for receiving a downstream signal from a splitter optically powered without electrical power, the downstream signal identifying at least one of a port over which the ONU is communicating with the splitter or a wavelength at which another ONU is operating; and
   a processor for generating an ONU wavelength, wherein the wavelength is adjustable responsive to the downstream signal from the splitter.

2. The optical network unit of claim 1, wherein the downstream signal identifies a wavelength X for operation over connected port N, the ONU responsive to the downstream signal for tuning to wavelength X.

3. The optical network unit of claim 1, wherein the wavelength chosen is an indication of the port number of the splitter to which the ONU is connected.

4. The optical network unit of claim 1, wherein the ONU and corresponding port is used for system mapping.

5. The optical network unit of claim 1, wherein the ONU can adjust its wavelength to avoid wavelengths taken by other ONUs.

6. The optical network unit of claim 1, wherein ONU does not require a priori knowledge of combiner for ONU configuration.

7. The optical network unit of claim 1, wherein the ONU determines its configuration uni-directional manner.

8. The optical network unit of claim 1, further comprising a tone input for listening for tones or frequency-shift keying (FSK) signals in the downstream signal to determine at what wavelength it should operate.

9. The optical network unit of claim 1, wherein the ONU can decode signaling informing about the port of an active 1×N splitter to which it is connected.

10. The optical network unit of claim 1, wherein the ONU may signal its current wavelength and identification code upstream to the splitter.

11. The optical network unit of claim 1, wherein responsive to identifying a wavelength conflict with another ONU at the same port, the ONU wavelength is adjustable by the ONU.

12. The optical network unit of claim 1, wherein the downstream signal identifies wavelength labels for other ONUs connected to the splitter for selecting a non-conflicting wavelength.

13. The optical network unit of claim 1, wherein downstream information identifies currently active upstream ports in use by the splitter.

14. The optical network unit of claim 1, wherein the ONU uses information in the downstream signal to configure itself for a connection to a port of the combiner, correlating information in the downstream signal to the ONU's activity.

* * * * *